No. 894,262. PATENTED JULY 28, 1908.
A. G. ELLINWOOD.
VEGETABLE HARVESTING MACHINE.
APPLICATION FILED JULY 26, 1906.

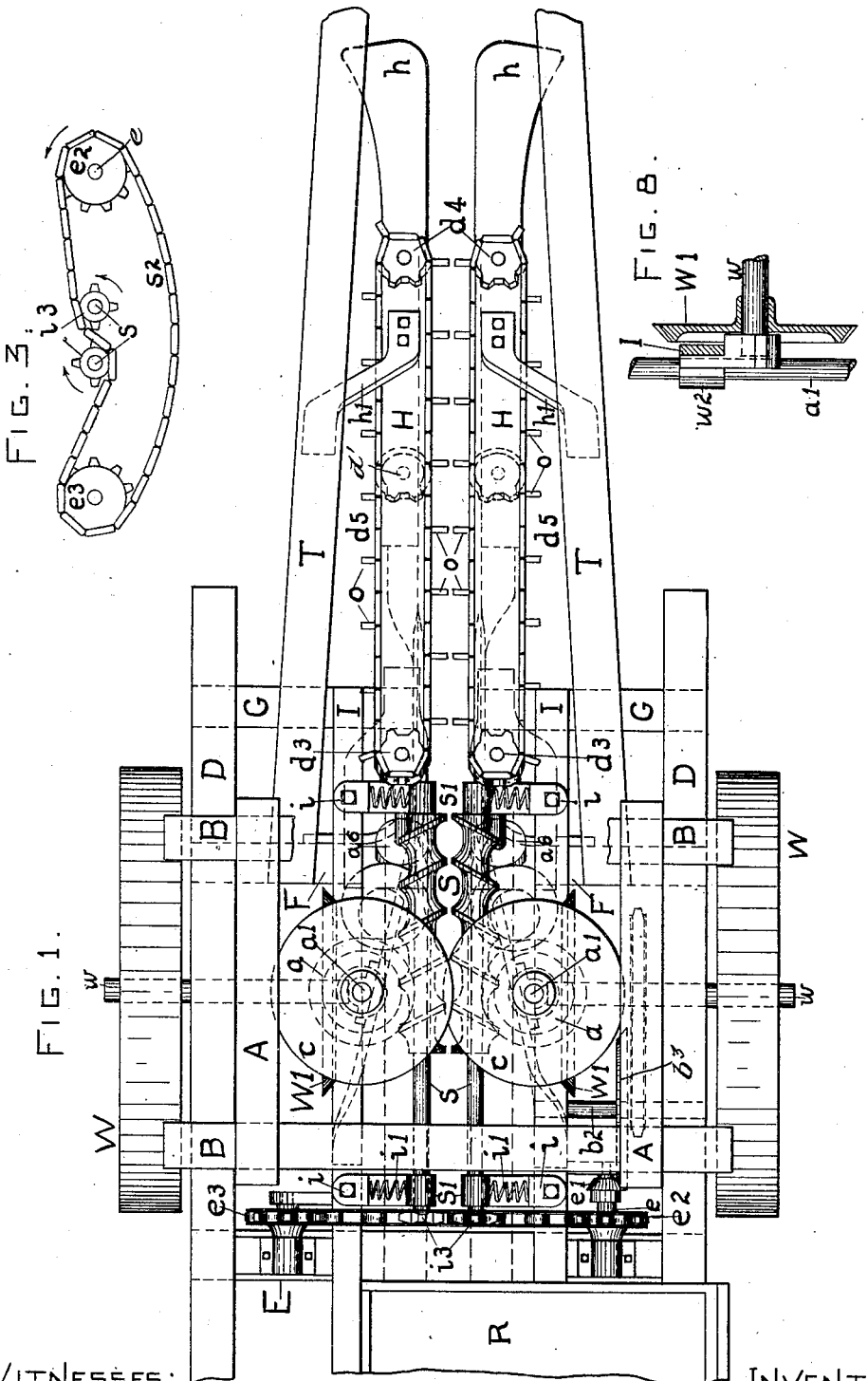

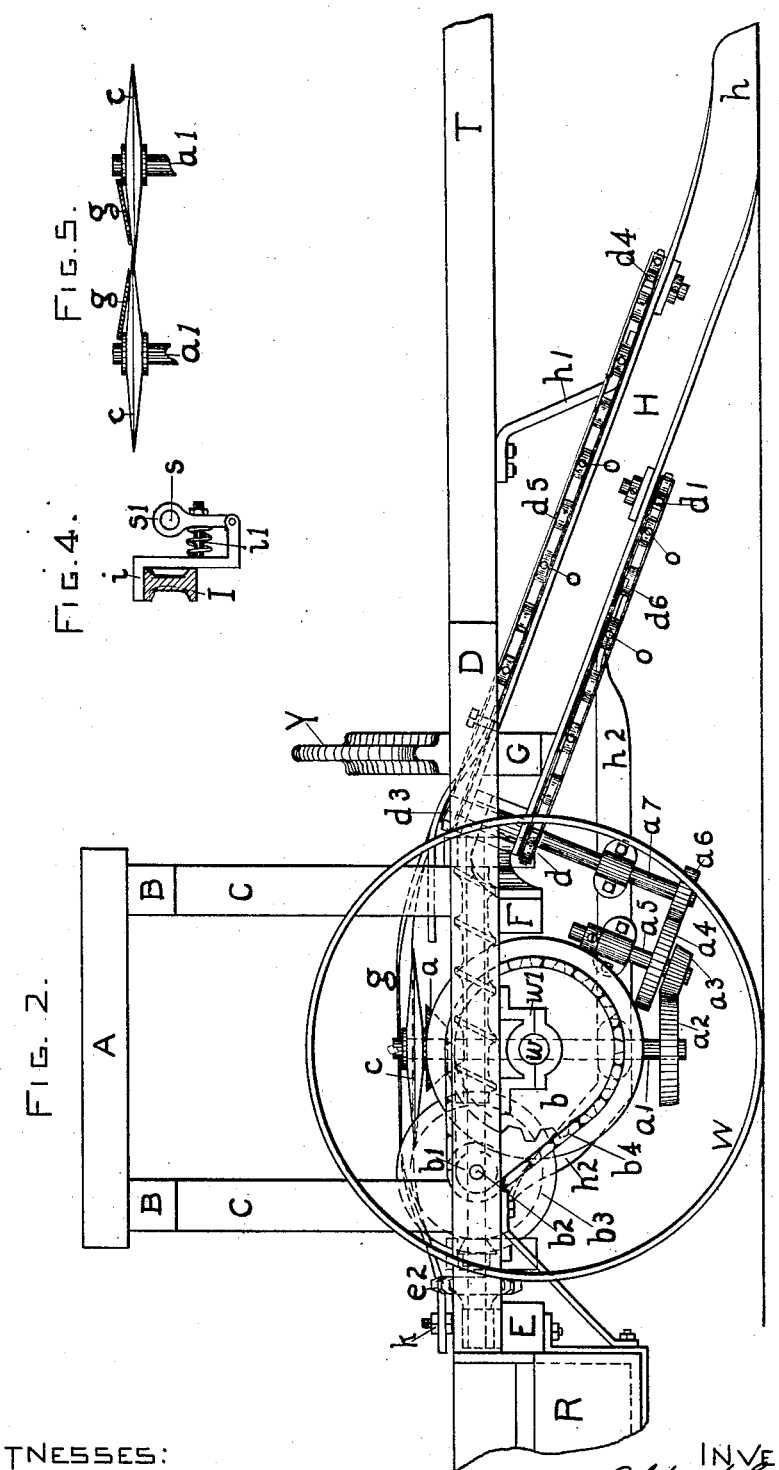

3 SHEETS—SHEET 3.

WITNESSES:
Lottie Wood.
Wm. G. Staudenmaier.

INVENTOR:
Albert G. Ellinwood
BY W. H. Cooley ATTY.

UNITED STATES PATENT OFFICE.

ALBERT G. ELLINWOOD, OF BATAVIA, NEW YORK.

VEGETABLE-HARVESTING MACHINE.

No. 894,262.  Specification of Letters Patent.  Patented July 28, 1908.

Application filed July 26, 1906. Serial No. 327,908.

*To all whom it may concern:*

Be it known that I, ALBERT G. ELLINWOOD, a citizen of the United States, and residing at Batavia, in the county of Genesee and State of New York, have invented a new and Improved Vegetable-Harvesting Machine, of which the following is a specification.

This invention relates to machines for withdrawing vegetables from the ground and, preferably, delivering them to a suitable basket, crate or other receptacle after having severed the vegetable transversely at some point in its vertical length.

My present invention comprises means for raising the vegetable or withdrawing it from the ground as the machine passes over the ground where the vegetables have been growing and delivering the vegetable to a cutting mechanism, and in providing also means whereby the point where the vegetable is cut or severed is entirely independent of the distance which such vegetable protrudes upwardly from or above the ground.

While many features of my invention are especially adapted to the harvesting of vegetables in general, that embodiment of my invention herein shown and described is more especially adapted to the harvesting of cabbages, and in such machine I provide means for grasping the stalk or stump of the cabbage just below the head and raising the cabbage from the ground, causing it to travel or pass, preferably in its pathway to a suitable receptacle, between or into engagement with suitable cutting blades or knives adapted to remove the stump from the cabbage at a point as close to the under side of the head as practicable, and I also provide means for adjusting the plane of such cut relative to the head of the cabbage and also means for drawing the cabbage, in the case of my present machine, downwardly so that the head thereof shall be engaged by and rest upon a suitable guard or support, normally fixed but adjustable relative to such cutting blades.

The accompanying drawings illustrating such a machine are as follows:—

Figure 6:
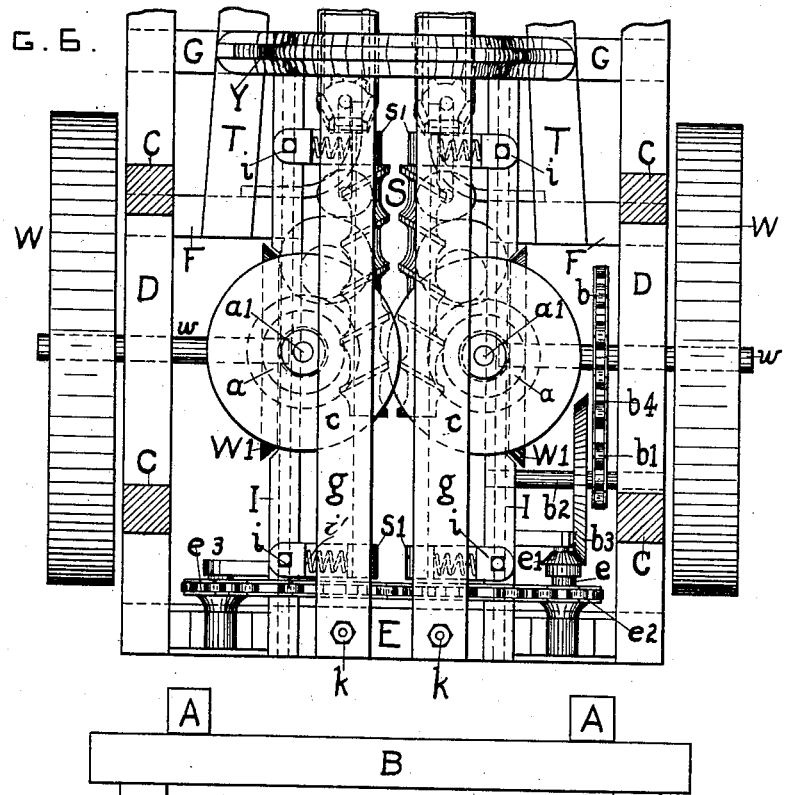
Figure 7:
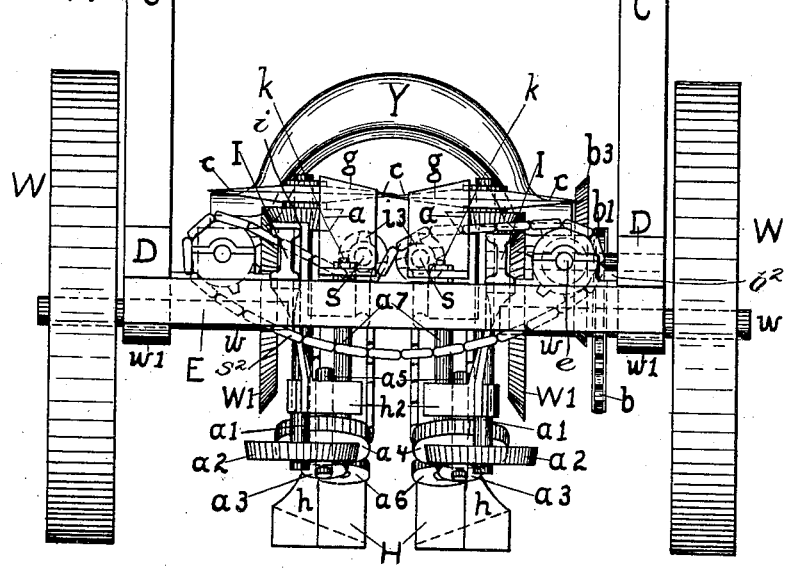

Figure 1 is a top view of the machine with the yoke Y and the guards $g$, seen in Figs. 2, 6 and 7, removed. In Fig. 1 some of the concealed parts are indicated in dotted lines, as will at once be understood. Fig. 2 is a side elevation of the machine, and in Fig. 2 also concealed parts are indicated in dotted lines. Fig. 3 is a rear end view of the mechanism for driving the worms S seen in Figs. 1 and 6. Fig. 4 shows the mechanism for yieldably supporting the shafts $s$ carrying the worms S. Fig. 5 is a view of the upper end of the shafts $a^1$ with the cutters $c$ thereon and the guards $g$ thereover. Fig. 6 is a top view of the rear portion of the machine, showing the guards $g$ and the yoke Y in place. In this figure also concealed portions are shown in dotted lines, as will at once be understood. Fig. 7 is a rear end elevation of the machine and Fig. 8 shows the arrangement of the bearing for revolubly supporting the inner ends of the shafts $w$ and the upper ends of the shafts $a^1$.

Similar letters refer to similar parts throughout the several views.

I will first describe the frame-work of my machine.

D are longitudinally disposed frame pieces having secured on the under sides thereof a continuous cross piece E at the rear and the discontinuous cross pieces F and G. Parallel with the frame pieces D are seen I beams I located considerably within the frame pieces D. These I beams I support the inner ends of the cross pieces F and to the inner ends of these cross pieces F are secured the upper ends of the inclined channel bars H, while the cross pieces G are secured on the under side, as stated, of the frame pieces D and they abut against and are secured to the channel beams H. Tongue timbers T are secured upon the upper sides of the cross pieces F and G. From the under side of these tongue pieces T there extend brackets $h^1$ to the upper sides of the channel beams H. The tongue pieces T are secured together by any suitable means not shown at their right hand and forward ends. Such tongue pieces are not shown in full as their arrangement and use is so thoroughly obvious as to call for no further description herein and the method of attaching them together at their right hand ends constitutes no part of my present invention. Resting upon and secured to the frame pieces D are seen the uprights C connected in transversely arranged pairs across their upper ends by means of the cross pieces B, and such cross pieces B are connected together by the tie beams A extending parallel with the frame pieces D. From the under side of the channel beams H there extend brackets $h^2$ rearwardly and upwardly and having their upper ends secured on the under side of the I beams I, such braces $h^2$ comprising flat plates of iron bent to a quarter twist at the point where they are attached to such I beams I and to the channel beams H. Just forward of the rear ends of the channel beams H there is secured the cast iron yoke Y having its feet or lower ends secured to the tongue pieces T and operating to securely and rigidly hold such tongue pieces and the other mechanism connected therewith at the proper distance apart and to prevent any spreading of the parts of the machine. The opening beneath this yoke Y is such as to permit the head of the largest cabbage, to be harvested, to pass freely thereunder.

The several parts of the above described frame-work of my machine are secured together by means of connections, which, forming no part of my present invention and being of a character so well known in the art as to call for no further illustration, are not herein shown and described.

To the rear of the machine and to the left, as seen partially in Figs. 1 and 2, there is secured a receptacle R being attached to the cross piece E and to the frame pieces D by means of brackets as shown. The wheels W of my machine, shown only in outline in Fig. 2, are secured upon the outer ends of shafts $w$, such shafts revoluble in bearings $w^1$ and $w^2$,—each of such bearings $w^2$ comprises in effect a double bearing and is supported on the side and under edge of its corresponding beam I, as shown in Fig. 8. The flanges of the I beam I are cut away, as indicated in Fig. 8 to receive the bearings $w^2$ and to receive and permit the rotation of the gears $w^1$. In the upper part of the bearings $w^2$ there are revolubly supported shafts $a^1$, and upon the upper ends of the shafts $a^1$ are secured the bevel gears $a$ meshing with the bevel gears $W^1$ secured on the inner ends of the shafts $w$. The lower ends of the shafts $a^1$ are revolubly supported in suitable bearings carried on the brackets $h^2$ and on the lower ends of these shafts $a^1$ and below the lower bearings therefor are secured the bevel gear wheels $a^2$ meshing in turn with the bevel gear wheels $a^3$ secured upon the lower ends of the shafts $a^5$ which are revoluble in bearings also carried by the brackets or braces $h^2$. These shafts $a^5$ carry the spur gears $a^4$ meshing with the spur gears $a^6$ secured on the lower ends of the shafts $a^7$, revoluble in bearings near their lower ends carried by the brackets $h^2$ and revolubly supported at their upper ends in bearings carried by the channel beams H. The upper ends of the shafts $a^7$ carry sprocket wheels $d^3$ just above the upper flanges of the channel beams H and these sprocket wheels $d^3$ are connected by sprocket chains $d^5$ with similar sprocket wheels $d^4$, revoluble upon studs projecting upwardly from the upper flanges of the channel beams H and near their lower ends. Just below the lower flanges on the channel beams H are seen sprocket wheels $d$ carried by the shafts $a^7$ and connected by sprocket chains $d^6$ with similar sprocket wheels $d^1$ revoluble upon studs projecting downwardly from the lower flanges of the channel beams H.

The right hand shaft $w$ has secured thereon and between the bearings therefor a sprocket wheel $b$ connected by a sprocket chain $b^4$ with the sprocket wheel $b^1$ upon the shaft $b^2$, upon which shaft there is secured the bevel gear $b^3$. The shaft $b^2$ has its bearings in the right hand frame piece D and I beam I. The bevel gear $b^3$ meshes in turn with the bevel gear $e^1$ carried upon the shaft $e$ revoluble in a gearing carried by the cross piece E, and over this sprocket wheel $e^2$ there passes a sprocket chain $s^2$ engaging the teeth on a similar sprocket wheel $e^3$ on a shaft, not seen, but revolubly supported in a bearing seen near the left hand end of the cross piece E. As indicated in the drawings and shown more fully in Fig. 3, the sprocket chain $s^2$ connecting the wheels $e^2$ and $e^3$ has considerable slack and passes over the right hand sprocket wheel $i^3$ and under the left hand sprcoket wheel $i^3$. The sprocket wheels $i^3$ are secured upon the shafts $s$, each revoluble in bearings $s^1$ therefor pivotally supported from the brackets $i$ secured one at the forward end and one at the rear end of each of the I beams I. The bearings $s^1$ have downward extensions pivoted to the lower ends of the brackets $i$ to permit the shafts $s$ to move to and from each other, and they are adjustably held at any desired distance apart by means of the springs $i^1$, as indicated in Fig. 4, operating to yieldably force the shafts $s$ towards each other. Bolts are provided for limiting the motion of such shafts $s$ towards each other, as also indicated in Fig. 4. The slack in the chain $s^2$ permits of this movement of the shafts $s$ to and from each other. The shafts $s$ carry the worms S whose function will be explained later.

On the upper ends of the shafts $a^1$ are secured the disk-like cutters $c$ and just above these cutters $c$ are located guards $g$ adjustably secured, at their rear ends on the bolts $k$ projecting upwardly from the cross piece E, and at their forward ends upon the upper flanges of the channel beams H where they extend over and are secured just forward of the sprocket wheels $d^3$. The rear ends of these guards $g$ being supported upon the bolts $k$ projecting upwardly from the cross piece E and such bolts being threaded and having nuts beneath and above the guards $g$, such guards $g$ may be adjustably supported at any desired height.

The lower ends of the channel beams H are formed up, as indicated in the drawings, into shovel-like projections adapted to engage under the head of the cabbage, and as the machine advances, the cabbage is brought into engagement with and between the sprocket chains $d^5$ and $d^6$, the links on such sprocket chains carrying projections $o$ adapted to more fully engage under the head of the cabbage, and, as the machine advances at nearly or quite the same rate at which the sprocket chains $d^5$ and $d^6$ are drawn to the rear with the cabbage between them, the cabbage is caused to be raised nearly or quite vertically out of the ground and then carried by such sprocket chains $d^5$ and $d^6$ to the rear until the upper end of the stump thereof is brought into engagement with the worms S, the left hand one of which, as seen in Figs. 6 and 7, revolves over to the right while the right hand one revolves over to the left, as shown by the arrows in Fig. 3, and by this means the stump of the cabbage is not only carried to the rear with the head of the cabbage resting in the guards $g$, but the action of these worms S is also such as to draw the stump downwardly as the cabbage is drawn to the rear, so that the head is brought firmly down upon the guards $g$, causing the cutter disks $c$ to sever the head from the stump at a point approximating very closely the under side of the head, and the point of the cut may readily be adjusted by the adjustable support already described and seen at the rear end of the guards $g$.

In using my harvesting machine the usual evener and whiffle trees are attached to the pole pieces T and the horses are hitched one upon each side of such pole pieces. The machine is thus drawn over the cabbage field with the wheels W one on each side of a row of cabbages and with such row practically in the center of the machine, the horses walking in the space between such center row and an adjacent row on each side. The scoop-like projection $h$ on the channel beams H engages under the heads of the cabbages as the machine advances until a cabbage is engaged by the sprocket chains $d^5$ and the projections $o$ on the links thereof, the proportion of the gears being preferably such that the machine advances at about the same rate that the inner adjacent members of the sprocket chains $d^5$ and $d^6$ are moved to the rear.

A receptacle R may be provided when desired to receive the heads of the cabbages after they have been severed from the stumps by means of the cutters $c$, each head as it is forced along by the worms S and severed from its stump operating to force the preceding heads to the rear on the guards $g$ from which they fall off into such receptacle.

I desire to call attention to the following features in my harvesting machine, viz,— The plane of the cut of the cutting device is independent of the height which the vegetables extend above the ground and also independent of the points in such vegetables engaged by the withdrawing mechanism. Again, means are provided for adjusting the plane of the cut relatively to the vegetables and that too independently of the height which the vegetables extend above the ground or of the points at which they are engaged by the withdrawing mechanism. There is also provided a guard against which the vegetables are drawn or forced as they are advanced to and into engagement with the cutting device and such guard is adjustable.

It will of course be understood that the range of adjustment may be varied to suit the conditions under which the machine is worked. By elongating the bolts $k$ the range of adjustment may be increased to any desired extent.

What I claim is:—

1. In a vegetable harvester; means for withdrawing the vegetables from the ground; a cutting device; mechanism separate from such withdrawing means adapted to receive the vegetables therefrom and operating to bring the vegetables into engagement with such cutting device; a guard adapted to engage and support a part of such vegetables and means for drawing such vegetables against such guard as they are advanced towards and into engagement with such cutting device.

2. In a vegetable harvester; means for withdrawing the vegetables from the ground; a cutting device; mechanism separate from such withdrawing means adapted to receive the vegetables therefrom and operating to bring the vegetables into engagement with such cutting device; a guard adjustable relatively to such cutting device and adapted to engage and support a part of such vegetables and means for drawing such vegetables against such guard as they are advanced towards and into engagement with such cutting device.

3. In a vegetable harvester; means for withdrawing the vegetables from the ground; a cutting mechanism; a guard adapted to engage the vegetables at a point between the ends, approximately at the cut and between the two portions thereof formed by the cut and means for bringing the vegetables into engagement with such cutting mechanism and holding them against such guard while being cut.

4. In a vegetable harvester; means for withdrawing the vegetables from the ground; a cutting mechanism; a guard adjustable relatively to such cutting mechanism and adapted to engage the vegetables at a point between the ends, approximately at the cut and between the two portions thereof formed by the cut and means for bringing the vegetables into engagement with such cutting mechanism and holding them against such guard while being cut.

5. In a vegetable harvester; means for withdrawing the vegetables from the ground;

a cutting mechanism; a guard adapted to engage the vegetables approximately at and between the two portions thereof formed by the cut and means, comprising a revolving worm and a coöperating member to hold the vegetables in engagement with the threads on the worm, whereby the vegetable is forced against the guard and into engagement with the cutting mechanism by the rotation of the worm.

6. In a vegetable harvester; means for withdrawing the vegetables from the ground; a cutting mechanism; a guard adapted to engage the vegetables approximately at the cut and between the two portions thereof formed by the cut and means, comprising two coöperating and oppositely rotating worms adapted to engage the vegetables between the threads thereon, whereby the vegetable is forced against the guard and into engagement with the cutting mechanism by the rotation of the worm.

7. In a vegetable harvester; means for withdrawing the vegetables from the ground; a cutting device; mechanism separate from such withdrawing means adapted to receive the vegetables therefrom and operating to bring them into engagement with such cutting device and means, adapted to engage the vegetables and to be reactively operated on thereby according to the varying conformations thereof, whereby the vegetables are brought into engagement with such cutting device at a practically constant point between the root and the top, determined by the conformations of the vegetables.

8. In a vegetable harvester; means for withdrawing the vegetables from the ground; a cutting device; mechanism separate from such withdrawing means adapted to receive the vegetables therefrom and operating to bring them into engagement with such cutting device; means, adapted to engage the vegetables and to be reactively operated on thereby according to the varying conformations thereof, whereby the vegetables are brought into engagement with such cutting device at a practically constant point between the root and the top, determined by the conformations of the vegetables and adjustable means for varying as desired such practically constant point.

9. In a vegetable harvester; means for withdrawing the vegetables from the ground; a cutting device; means for bringing the vegetables into engagement with such cutting device and means, adapted to engage the vegetables and to be reactively operated on thereby according to the varying conformations thereof, whereby the vegetables are brought into engagement with such cutting device at a practically constant point between the root and the top, determined by the conformations of the vegetables.

10. In a vegetable harvester; means for withdrawing the vegetables from the ground; a cutting device; means for bringing the vegetables into engagement with such cutting device; means, adapted to engage the vegetables and to be reactively operated on thereby according to the varying conformations thereof, whereby the vegetables are brought into engagement with such cutting device at a practically constant point between the root and the top, determined by the conformations of the vegetables and adjustable means for varying as desired such practically constant point.

11. In a vegetable harvester; a cutting device; means for bringing the vegetables into engagement with such cutting device and means, adapted to engage the vegetables and to be reactively operated on thereby according to the varying conformations thereof, whereby the vegetables are brought into engagement with such cutting device at a practically constant point between the root and the top, determined by the conformations of the vegetables.

12. In a vegetable harvester; a cutting device; means for bringing the vegetables into engagement with such cutting device; means, adapted to engage the vegetables and to be reactively operated on thereby according to the varying conformations thereof, whereby the vegetables are brought into engagement with such cutting device at a practically constant point between the root and the top, determined by the conformations of the vegetables and adjustable means for varying as desired such practically constant point.

ALBERT G. ELLINWOOD.

Witnesses:
 LOTTIE WOOD,
 WM. G. STANDENMAIER.